United States Patent
Chishima et al.

(10) Patent No.: US 11,846,317 B2
(45) Date of Patent: Dec. 19, 2023

(54) TAPERED ROLLER BEARING

(71) Applicant: NSK LTD., Tokyo (JP)

(72) Inventors: Masaki Chishima, Fujisawa (JP);
Hiroaki Yamanaka, Fujisawa (JP);
Hiroyuki Ohshima, Fujisawa (JP)

(73) Assignee: NSK LTD., Tokyo (JP)

( * ) Notice: Subject to any disclaimer, the term of this patent is extended or adjusted under 35 U.S.C. 154(b) by 284 days.

(21) Appl. No.: 17/441,933

(22) PCT Filed: Mar. 19, 2020

(86) PCT No.: PCT/JP2020/012520
§ 371 (c)(1),
(2) Date: Sep. 22, 2021

(87) PCT Pub. No.: WO2020/196342
PCT Pub. Date: Oct. 1, 2020

(65) Prior Publication Data
US 2022/0196065 A1    Jun. 23, 2022

(30) Foreign Application Priority Data

Mar. 25, 2019  (JP) ................................. 2019-056970

(51) Int. Cl.
*F16C 19/36*    (2006.01)
*F16C 33/36*    (2006.01)
*F16C 33/58*    (2006.01)

(52) U.S. Cl.
CPC .......... *F16C 19/364* (2013.01); *F16C 33/366* (2013.01); *F16C 33/585* (2013.01); *F16C 2202/04* (2013.01); *F16C 2240/54* (2013.01)

(58) Field of Classification Search
CPC .... F16C 19/364; F16C 33/366; F16C 33/585; F16C 33/6651; F16C 33/664; F16C 2202/04; F16C 2240/54
See application file for complete search history.

(56) References Cited

U.S. PATENT DOCUMENTS 8,955,225 B2 * 2/2015 Kobayashi ............. B24C 11/00
                                                        29/90.7
2002/0051594 A1 * 5/2002 Takehara ................ F16C 33/64
                                                        384/450

(Continued)

FOREIGN PATENT DOCUMENTS

CN    1385625 A    12/2002
CN    102483093 A    5/2012

(Continued)

OTHER PUBLICATIONS

International Search Report (PCT/ISA/210) dated Jun. 16, 2020 issued by the International Searching Authority in International Application No. PCT/JP2020/012520.

(Continued)

*Primary Examiner* — Alan B Waits
(74) *Attorney, Agent, or Firm* — Sughrue Mion, PLLC

(57) ABSTRACT

In a tapered roller bearing, the surface roughness of at least a rolling surface and a large diameter-side end surface of a tapered roller is 0.02 to 0.17 μm in protruding mountain portion height Rpk, 0.12 to 0.21 μm in core portion level difference Rk, and 0.07 to 0.43 μm in protruding valley portion height Rvk and the average recessed portion area in the fine irregularities on the surface of the tapered roller is 5 μm² or less. As a result, oil film formability can be improved under dilute lubrication and a decline in lubricating oil viscosity and surface damage at a rolling contact part and an increase in friction at a sliding contact part can be suppressed at the same time.

4 Claims, 5 Drawing Sheets

(56) References Cited

U.S. PATENT DOCUMENTS

| | | | | |
|---|---|---|---|---|
| 2002/0181820 A1* | 12/2002 | Suzuki | ............... | F16C 33/6614 384/571 |
| 2003/0198420 A1* | 10/2003 | Matsuyama | .......... | F16C 19/364 384/450 |
| 2006/0182377 A1 | 8/2006 | Akamatsu | | |
| 2008/0053396 A1 | 3/2008 | Hiraishi et al. | | |
| 2013/0170780 A1 | 7/2013 | Saito et al. | | |
| 2022/0058304 A1* | 2/2022 | Murata | ................... | F16C 17/24 |
| 2022/0196065 A1* | 6/2022 | Chishima | .............. | F16C 19/364 |
| 2022/0333640 A1* | 10/2022 | Kawai | ................... | F16C 33/585 |
| 2022/0373030 A1* | 11/2022 | Kawai | ................... | F16C 33/366 |

FOREIGN PATENT DOCUMENTS

| | | | |
|---|---|---|---|
| EP | 1344953 | A2 | 9/2003 |
| JP | 2002187049 | A | 7/2002 |
| JP | 2003269468 | A | 9/2003 |
| JP | 2004-183783 | A | 7/2004 |
| JP | 2004-308665 | A | 11/2004 |
| JP | 2007-120651 | A | 5/2007 |
| JP | 200857478 | A | 3/2008 |
| JP | 4754234 | B2 | 8/2011 |
| JP | 4994638 | B2 | 8/2012 |
| JP | 2015094402 | A | 5/2015 |
| JP | 2017082977 | A | 5/2017 |

OTHER PUBLICATIONS

Written Opinion (PCT/ISA/237) dated Jun. 16, 2020 issued by the International Searching Authority in PCT/JP2020/012520.
Communication dated Oct. 21, 2022 by the Chinese Patent Office for Chinese Patent Application No. 202080024174.5.
Communication issued by the European Patent Office dated Apr. 28, 2022 in EP Application No. 20776638.7.
Deleanu et al., "A Comparison Between 2D and 3D Surface Parameters for Evaluating the Quality of Surfaces", Jan. 1, 2012, XP055913067, https://www.researchgate.net/profile/Constantin-Georgescu/publication/285298629_A_comparison_between_2D_and_3D_surface_parameters_for_evaluating_the_quality_of_surface/links/56657c0908ae418a786ef43f/A-comparison-between-2D-and-3D-surface-parameters-for-evaluating-the-quality-of-surfaces.pdf, (8 pages total).

* cited by examiner

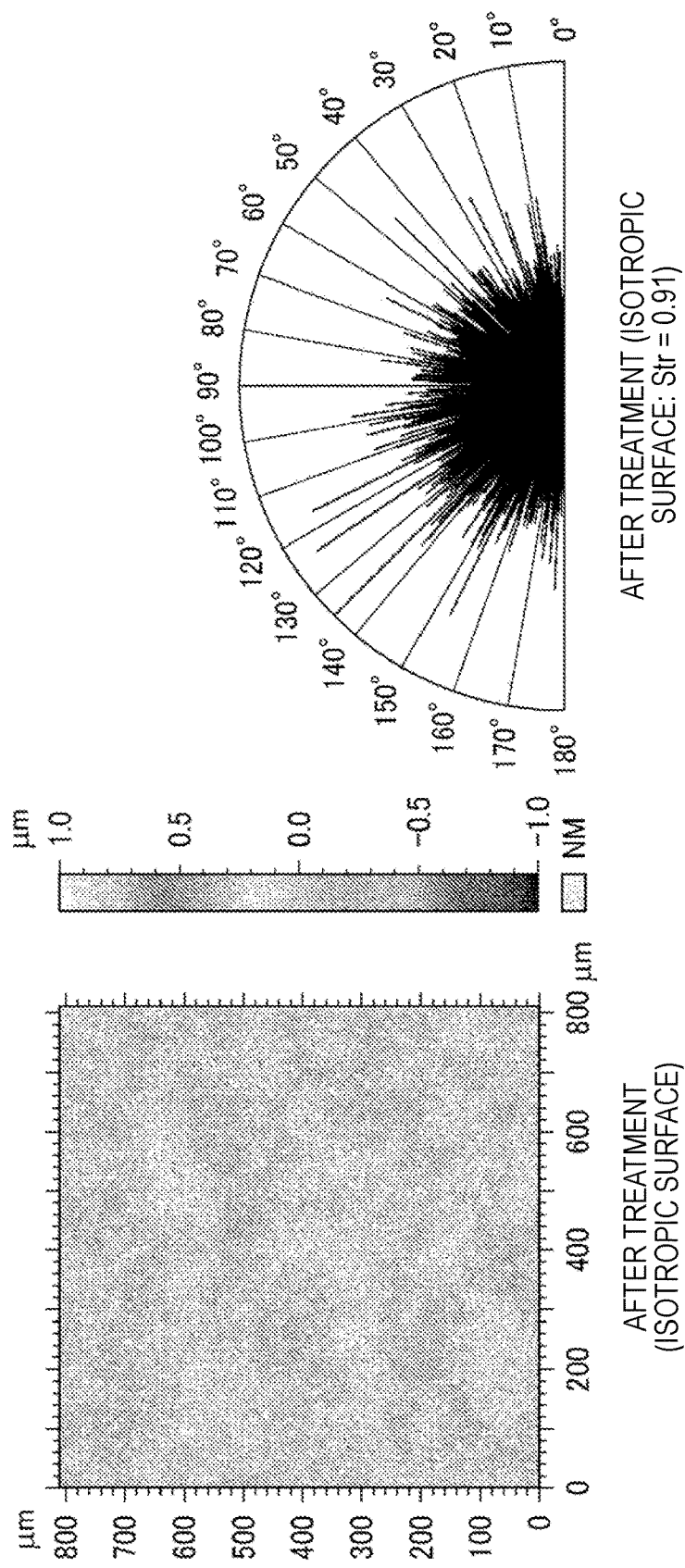

TAPERED ROLLER BEARING

TECHNICAL FIELD

The present invention relates to a tapered roller bearing and more particularly to a tapered roller bearing used in vehicular transmissions and differentials.

BACKGROUND ART

In recent years, rolling bearings used in transmissions and the like have also been required to enhance rotational efficiency in use under low-stirring resistance dilute lubrication and a decline in lubricating oil viscosity from the viewpoint of reducing fuel consumption in response to $CO_2$ emission regulations and reducing electricity consumption in the case of electric vehicles.

In addition, in the related art, various methods have been devised to specify the surface texture of a rolling element with respect to a rolling bearing used under such dilute lubrication. For example, in the rolling bearing described in Patent Literature 1, innumerable independent dents with the shape of a micro-recessed portion are randomly formed on at least one of the surface of a rolling element and the raceway surface of a raceway ring, the non-dent part has the form of a smooth surface, and it is defined that the area ratio of the dent is 14% or more and 21% or less, the average area is 10 $\mu m^2$ or more and 30 $\mu m^2$ or less, the maximum area is 300 $\mu m^2$ or more and 500 $\mu m^2$ or less, and the volume of the dent is 0.007 $mm^3/cm^2$ or more and 0.010 $mm^3/cm^2$ or less in the event of arrangement with the exception of φ3 μm or less in equivalent circle diameter.

In addition, in the tapered roller bearing described in Patent Literature 2, a roller coefficient γ exceeds 0.94 by roller pitch diameter reduction, innumerable micro-recess-shaped dents are randomly provided on the surface of the tapered roller, and the surface where the dent is provided has a surface roughness parameter Ryni of 0.4 μm or more and 1.0 μm or less with an Sk value of −1.6 or less with a cage having a specific shape.

CITATION LIST

Patent Literature

Patent Literature 1: JP-B-4754234
Patent Literature 2: JP-B-4994638

SUMMARY OF INVENTION

Technical Problem

By the way, in a case where a rolling element having the surface texture described in Patent Literature 1 is applied to a tapered roller bearing, it is conceivable that surface damage such as peeling can be suppressed at the rolling contact part between the rolling surface of the tapered roller and the raceway surface of a raceway ring, even under dilute lubrication and a decline in lubricating oil viscosity, by improving the oil film formability of the rolling contact part. However, with respect to the sliding contact part between the large diameter-side end surface of the tapered roller and a large flange portion, bearing rotation torque deterioration, seizure, and the like may arise due to an increase in friction because the unevenness of the large diameter-side end surface of the tapered roller is large and the effect of oil film formability deterioration attributable to surface roughness deterioration exceeds the effect of oil film formability improvement resulting from lubricating oil retainability improvement.

In addition, the sliding contact part between the large diameter-side end surface of a tapered roller and a large flange portion is not considered in the tapered roller bearing described in Patent Literature 2, either.

In this regard, an object of the present invention is to provide a tapered roller bearing with which surface damage at a rolling contact part and bearing rotation torque deterioration and seizure property deterioration at a sliding contact part can be suppressed at the same time without oil film formability deterioration under dilute lubrication and a decline in lubricating oil viscosity by defining the surface texture of a tapered roller using a parameter indicating the texture more accurately.

Solution to Problem

In other words, the above object of the present invention is achieved by the following configuration.

(1) A tapered roller bearing including:
an inner ring and an outer ring; and
a plurality of tapered rollers rollably disposed between the inner ring and the outer ring,
in which surface roughness of at least a rolling surface and a large diameter-side end surface of each of the tapered rollers is 0.02 to 0.17 μm in reduced peak height Rpk, 0.12 to 0.21 μm in core roughness depth Rk, and 0.07 to 0.43 μm in reduced valley depth Rvk and an average recessed portion area in fine irregularities on a surface of the tapered roller is 5 $\mu m^2$ or less.

(2) The tapered roller bearing according to (1), in which the surface of each of the tapered rollers is finished by barrel processing, and
polar surface hardness on the surface is 105% to 135% with respect to the surface before the barrel processing.

(3) The tapered roller bearing according to (1) or (2), in which an aspect ratio Str of a surface texture of each of the tapered rollers is 0.2 or more.

Advantageous Effects of Invention

As for the surface texture of at least the rolling surface and the large diameter-side end surface in the tapered roller bearing of the present invention, Rpk, Rk, and Rvk are defined in the above specific ranges with the average recessed portion area as small as 5 $\mu m^2$ or less in the finer irregularities. Accordingly, oil film formability can be improved under dilute lubrication and a decline in lubricating oil viscosity and surface damage at a rolling contact part and bearing rotation torque deterioration and seizure property deterioration at a sliding contact part can be suppressed at the same time. As a result, a long-life tapered roller bearing can be obtained without causing problems such as bearing rotation torque deterioration and seizure property deterioration.

BRIEF DESCRIPTION OF DRAWINGS

FIG. 3A illustrates the three-dimensional surface roughness of the surface of the rolling surface of the tapered roller after barrel processing, and FIG. 3B is a polar coordinate graph representing the three-dimensional surface roughness in an angular spectrum.

DESCRIPTION OF EMBODIMENTS

Hereinafter, a tapered roller bearing according to an embodiment of the present invention will be described in detail with reference to the drawings.

Figure 1:
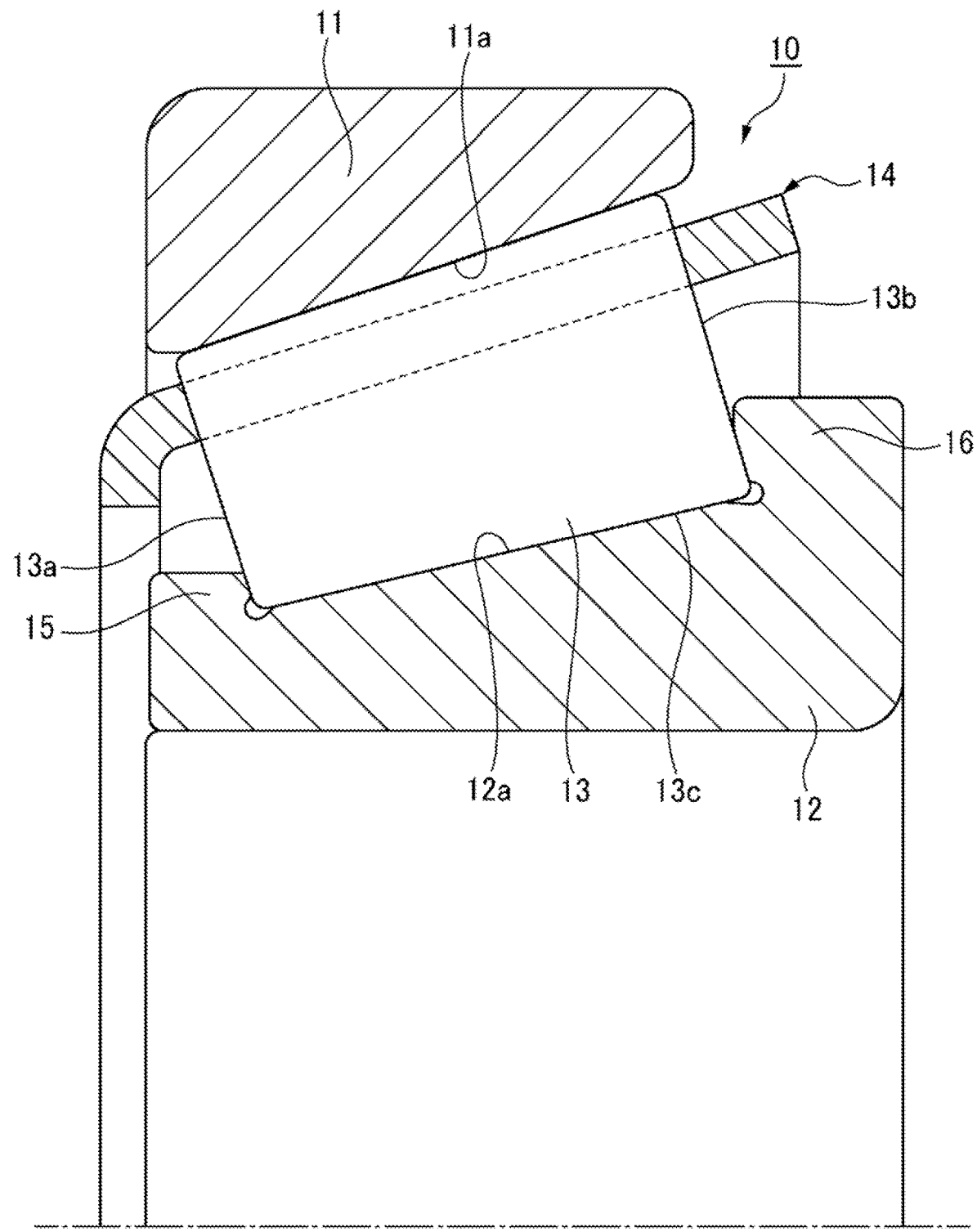
FIG. 1 is a cross-sectional view illustrating an example of a tapered roller bearing.

As illustrated in FIG. 1, a tapered roller bearing 10 of the present embodiment is applied to a vehicular transmission and a vehicular differential used in a lubricating environment poor in oil film formability such as dilute lubrication and a decline in lubricating oil viscosity. The tapered roller bearing 10 includes an outer ring 11 having an outer ring raceway surface 11a on the inner peripheral surface thereof, an inner ring 12 having an inner ring raceway surface 12a on the outer peripheral surface thereof, a plurality of tapered rollers 13 rollably disposed between the outer ring raceway surface 11a and the inner ring raceway surface 12a, and a cage 14 holding the plurality of tapered rollers 13 at equal intervals in the circumferential direction.

The inner ring 12 has a small flange portion 15 provided in the small diameter-side end portion of the inner ring raceway surface 12a and a large flange portion 16 provided in the large diameter-side end portion of the inner ring raceway surface 12a. The small flange portion 15 comes into contact with a small diameter-side end surface 13a of the tapered roller 13, and the large flange portion 16 comes into contact with a large diameter-side end surface 13b of the tapered roller 13.

Figure 2B:
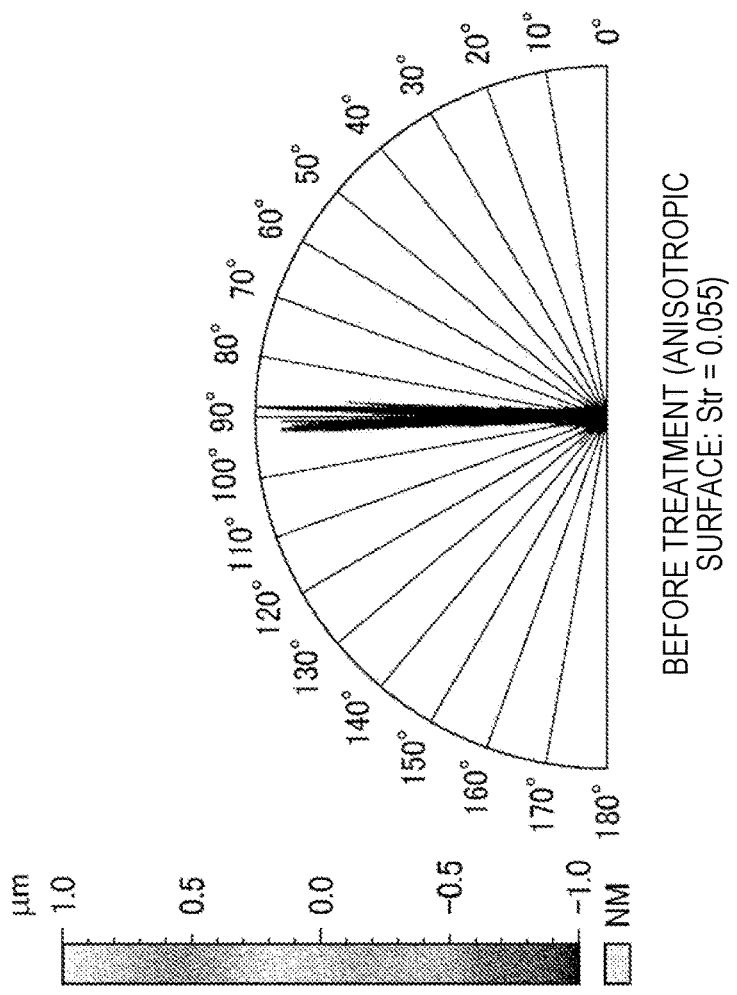
FIG. 2B is a polar coordinate graph representing the three-dimensional surface roughness in an angular spectrum.
Figure 2A:
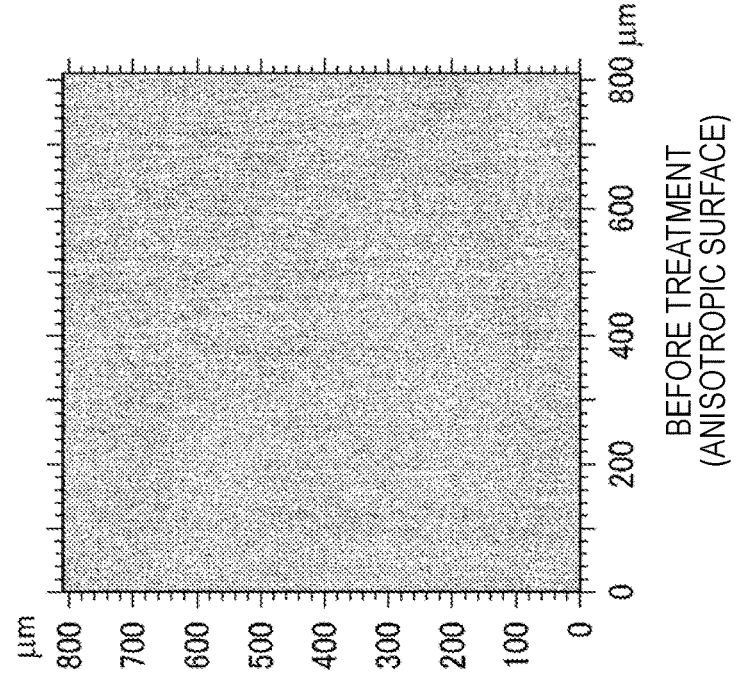
FIG. 2A illustrates the three-dimensional surface roughness of the surface of the rolling surface of a tapered roller after grinding finishing.

In manufacturing the tapered roller 13 of the tapered roller bearing 10, a truncated cone-shaped intermediate material is formed by performing plastic working such as forging on a columnar material such as bearing steel. Then, at least a rolling surface 13c and the large diameter-side end surface 13b are ground and grinding-finished. Then, immediately after the grinding finishing, the respective surfaces of the tapered rollers 13 become directional surfaces (anisotropic surfaces) where multiple fine streaky irregularities formed. FIG. 2A illustrates the three-dimensional surface roughness obtained by measuring the surface of the rolling surface 13c of the tapered roller 13 with a three-dimensional surface roughness measuring instrument immediately after the grinding finishing, and FIG. 2B is a polar coordinate graph representing the three-dimensional surface roughness in an angular spectrum, in which one strong peak (angular spectrum) appears in a certain direction (near 90° in FIG. 2B). It should be noted that the polar coordinate graph and the angular spectrum are defined in ISO 25178. In such streaky processing marks, valley portions are aligned in one direction and the lubricating oil holding capacity is low.

In this regard, in the present embodiment, barrel processing is performed on the entire surface of each tapered roller 13 including the rolling surface 13c, the small diameter-side end surface 13a, and the large diameter-side end surface 13b after the grinding finishing and multiple fine and non-directional irregularities defined below are formed on the entire surface as a result. In particular, the rolling surface 13c and the large diameter-side end surface 13b of the tapered roller 13 are (a) 0.02 to 0.17 µm and preferably 0.03 to 0.10 µm in reduced peak height Rpk, (b) 0.12 to 0.21 µm and preferably 0.12 to 0.19 µm in core roughness depth Rk, (c) 0.07 to 0.43 µm and preferably 0.17 to 0.41 µm in reduced valley depth Rvk, and (d) 5 µm$^2$ or less, preferably 1 µm$^2$ or less, and more preferably 0.8 µm$^2$ or less in average recessed portion area.

It should be noted that Rpk, Rk, and Rvk are defined in ISO 13565-1 (JIS B 0671-2). In addition, the average recessed portion area is the area of the tapered roller 13 at the outermost surface position.

With the fine irregularities satisfying the requirements of (a) to (d), surface damage attributable to an oil film running out at the rolling contact part between the rolling surface 13c of the tapered roller 13 and the raceway surfaces 11a and 12a of the outer ring 11 or the inner ring 12 can be suppressed, bearing rotation torque deterioration and seizure property deterioration can be suppressed at the sliding contact part between the large diameter-side end surface 13b of the tapered roller 13 and the large flange portion 16, a satisfactory state of lubrication can be maintained at each contact part, and the long-life tapered roller bearing 10 can be obtained even under dilute lubrication and a decline in lubricating oil viscosity.

In addition, the hardness of the polar surface of the tapered roller 13 can also be enhanced by the barrel processing. Although the post-barrel processing hardness of the polar surface varies depending on the steel type and heat treatment, the hardness in the present embodiment is 105% to 135% and preferably 110 to 120% higher than the pre-barrel processing hardness. The life can be improved by the hardness of the polar surface being enhanced. It should be noted that the polar surface refers to the part where the depth from the surface is up to 5 µm and the hardness of the polar surface is the hardness at a time when measurement at a test force of 100 g has been performed with a Micro Vickers hardness measuring machine.

In addition, a three-dimensional surface roughness as illustrated in FIG. 3A and a polar coordinate graph as illustrated in FIG. 3B can be obtained when the surface of the rolling surface 13c of the tapered roller 13 after the barrel processing is similarly measured using a three-dimensional surface roughness measuring instrument. In this case, the entire surface of every tapered roller 13 after the barrel processing including the rolling surface 13c, the small diameter-side end surface 13a, and the large diameter-side end surface 13b is a non-directional surface (isotropic surface) and the angular spectrum is dispersed in almost all directions. Also, it can be said that the peak height of the angular spectrum does not become particularly high only at a specific angle and irregularities are uniformly distributed in almost all directions.

The surface texture aspect ratio Str that is defined by ISO 25178 is known as an index representing anisotropic and isotropic surfaces. This Str is in the range of 0 to 1, and the ratio that is closer to 1 indicates a higher level of isotropy. In the present embodiment, the aspect ratio Str of the surface texture of each of the surfaces 13a, 13b, and 13c of the tapered roller 13 is preferably 0.2 or more, more preferably 0.5 or more, and particularly preferably 0.7 or more. When the Str is less than 0.2, the isotropy of the irregularities is insufficient, the lubricating oil holding capacity of the irregularities is not sufficient, and the effect of durability improvement may not be sufficiently obtained.

Examples

Hereinafter, the effects of the present invention were confirmed by Tests 1 to 3 and using an example in the related art, an example, and a reference example.

It should be noted that a tapered roller of a tapered roller bearing was produced by performing plastic working, grinding, and grinding finishing on a steel material (SUJ2) in the example in the related art. In addition, in the example, the surface texture illustrated in Table 1 was obtained by further performing barrel processing on the tapered roller of the example in the related art. Further, in the reference example, the surface texture illustrated in Table 1 was obtained by performing barrel processing on the tapered roller of the example in the related art under conditions different from those of the example. It should be noted that the number of tapered rollers, which is n, is 30 and Rpk, Rk, and Rvk represent the minimum and maximum values of the n tapered rollers in the reference example and the example in Table 1.

TABLE 1

|  | Rpk (µm) | Rk (µm) | Rvk (µm) | Average recessed portion area |
|---|---|---|---|---|
| Reference example | 0.01 to 0.29 | 0.17 to 0.37 | 0.25 to 0.95 | 1.2 µm² or less |
| Example | 0.02 to 0.17 | 0.12 to 0.21 | 0.07 to 0.43 | 0.8 µm² or less |

(Test 1)

The same supply amount of low-viscosity oil (assumed to be ISO VG10 to VG15) was supplied as lubricating oil to tapered roller bearings using the tapered rollers of the example in the related art and the example, and a durability test was conducted assuming conditions under dilute lubrication. In the durability test, a dynamic equivalent load of approximately 20000 N was applied, bearing rotation was performed at a rotation speed of 4000 min$^{-1}$, and the rotation time until the occurrence of an abnormality was measured.

Figure 4:
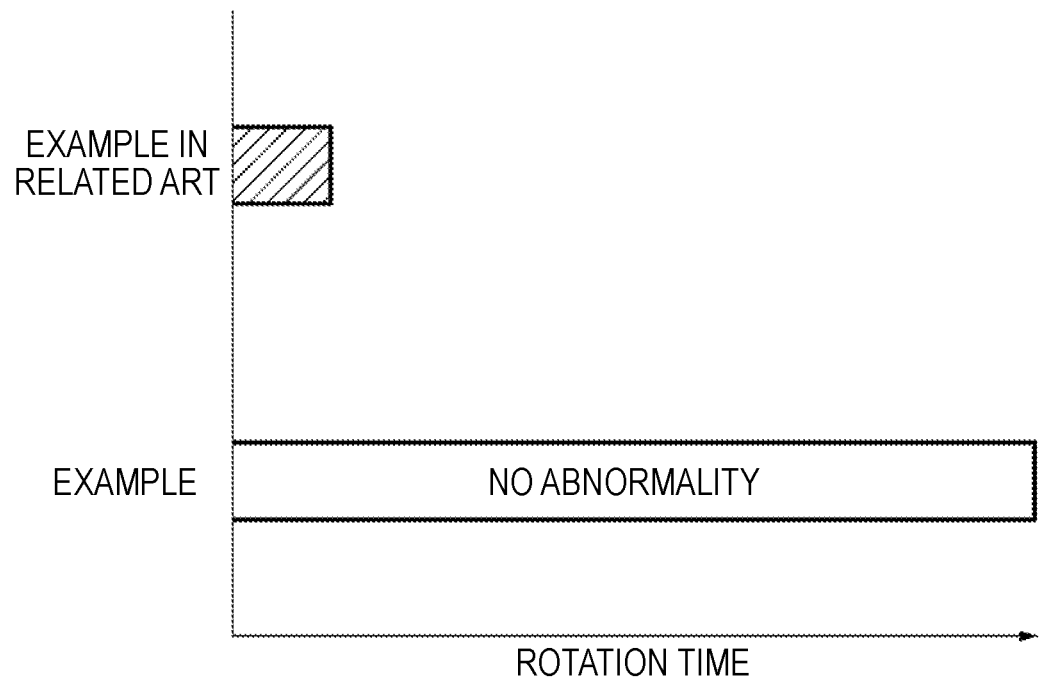
FIG. 4 is a graph illustrating the result of Test 1.

As a result, it was found that no abnormality occurred even after rotation time that is approximately eight times the rotation time of the example in the related art and the oil film formability improvement effect of the fine irregularities led to durability improvement in the example whereas an abnormality such as peeling that is likely to occur in a situation in which the rolling surface of a tapered roller is poor in oil film formability occurred early in the example in the related art as illustrated in FIG. 4.

(Test 2)

Next, general-purpose oil equivalent to ISO VG32 was applied, as lubricating oil and before test commencement, to tapered roller bearings using the tapered rollers of the example in the related art, the example, and the reference example. During the test, an axial load of 4000 N was applied without lubricating oil supply, bearing rotation was performed at a rotation speed of 4000 min$^{-1}$, and the rotation time (seizure life) until seizure between the large diameter-side end surface and the large flange portion, which is mainly sliding friction, was measured.

Figure 5:
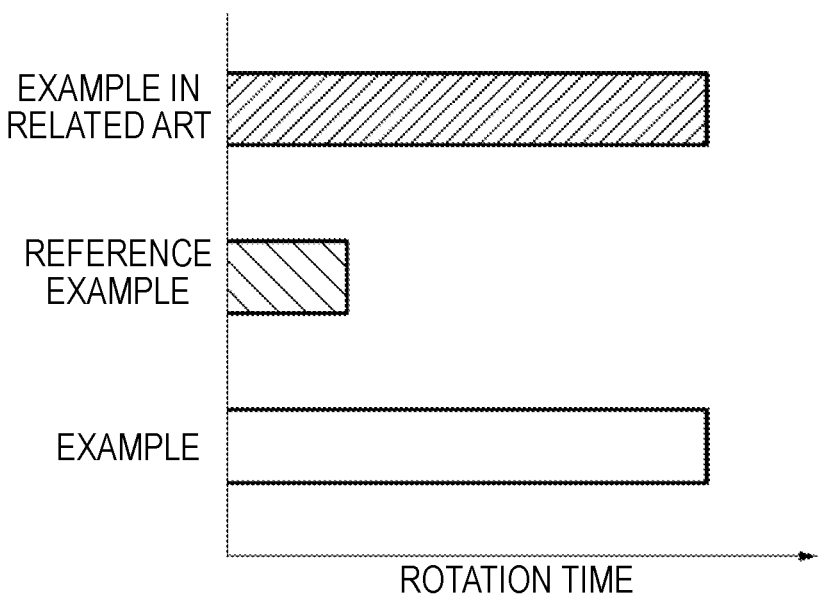
FIG. 5 is a graph illustrating the result of Test 2.

As a result, the seizure life in the reference example was reduced to approximately ¼ of the seizure life in the example in the related art and the seizure life in the example whereas the seizure life in the example in the related art and the seizure life in the example were almost the same as illustrated in FIG. 5. It is conceivable that this is because the fine irregularities are larger in the reference example than in the example and thus heat generation increased due to an increase in friction between the large diameter-side end surface and the large flange portion.

(Test 3)

Further, the rotation speed of the bearing was changed, an axial load of 3000 N was applied, and the bearing rotation torque for each rotation speed was measured while supplying the same lubricating oil as in Test 2 to tapered roller bearings using the tapered rollers of the example in the related art, the example, and the reference example.

Figure 6:
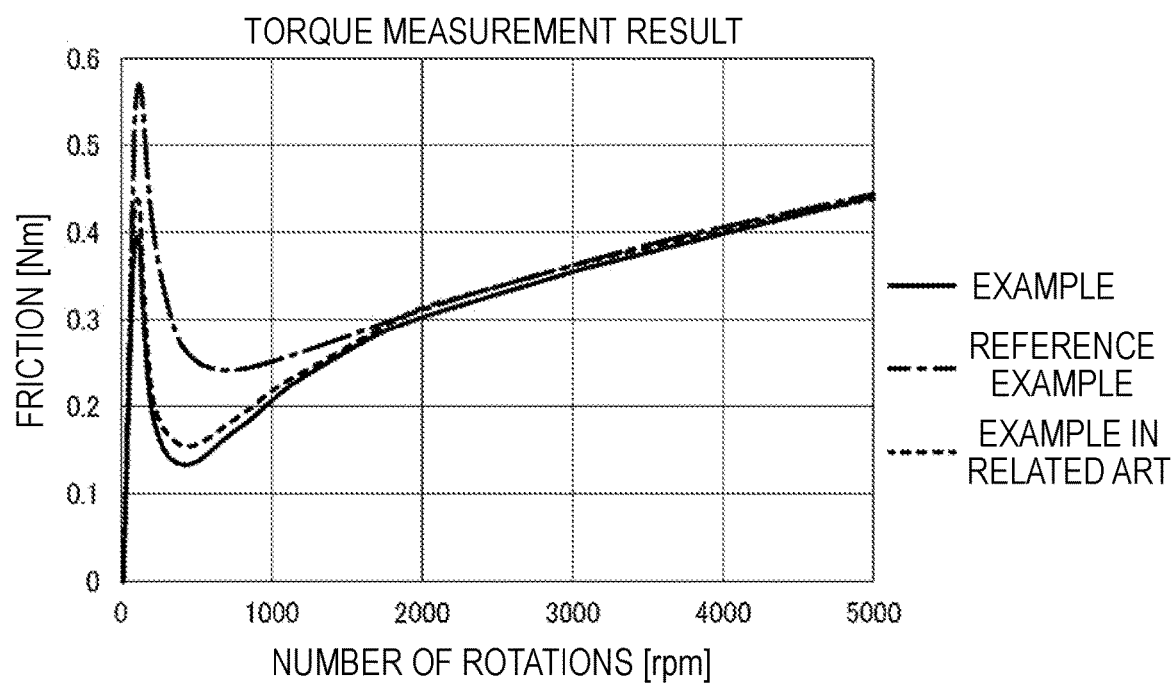
FIG. 6 is a graph illustrating the result of Test 3.

This result is illustrated in FIG. 6, in which it can be seen that the bearing rotation torque at a low speed is large in the reference example, in which the fine irregularities are larger than in the example, whereas the example and the example in the related art show almost the same behavior.

It could be confirmed from the above results that satisfactory durability, seizure resistance, and torque performance can be obtained with the tapered roller bearing including the plurality of tapered rollers, in which the reduced peak height Rpk is 0.02 to 0.17 µm, the core roughness depth Rk is 0.12 to 0.21 µm, and the reduced valley depth Rvk is 0.07 to 0.43 µm in terms of the respective surface textures and the average recessed portion area in the fine irregularities on the surface of the tapered roller is 0.8 µm² or less.

Although various embodiments have been described above with reference to the drawings, it is a matter of course that the present invention is not limited to such examples. It is clear that those skilled in the art can conceive various changed or modified examples within the scope of the claims, and it is naturally understood that the examples also belong to the technical scope of the present invention. In addition, each component in the embodiments described above may be combined in any manner insofar as the combination does not deviate from the gist of the invention.

It should be noted that this application is based on Japanese Patent Application No. 2019-56970 filed on Mar. 25, 2019, the contents of which are incorporated herein by reference.

REFERENCE SIGNS LIST

10 Tapered roller bearing
11 Outer ring
12 Inner ring
13 Tapered roller
13b Large diameter-side end surface
13c Rolling surface

The invention claimed is:

1. A tapered roller bearing comprising:
an inner ring and an outer ring; and
a plurality of tapered rollers rollably disposed between the inner ring and the outer ring,
wherein surface roughness of at least a rolling surface and a large diameter-side end surface of each of the tapered rollers is 0.02 to 0.17 µm in reduced peak height Rpk, 0.12 to 0.21 µm in core roughness depth Rk, and 0.07 to 0.43 µm in reduced valley depth Rvk and an average recessed portion area in fine irregularities on a surface of the tapered roller is 5 µm² or less.

2. The tapered roller bearing according to claim 1, wherein
the surface of each of the tapered rollers is finished by barrel processing, and polar surface hardness on the surface is 105% to 135% with respect to the surface before the barrel processing.

3. The tapered roller bearing according to claim 1, wherein an aspect ratio Str of a surface texture of each of the tapered rollers is 0.2 or more.

4. The tapered roller bearing according to claim 2, wherein an aspect ratio Str of a surface texture of each of the tapered rollers is 0.2 or more.

\* \* \* \* \*